(12) United States Patent
Sekar et al.

(10) Patent No.: US 10,576,682 B2
(45) Date of Patent: Mar. 3, 2020

(54) SYSTEM AND METHOD FOR CONDITIONING PAINT-ROLLER COVER FABRIC

(71) Applicants: Chandra Sekar, Albertson, NY (US); Santosh Sekar, New York, NY (US)

(72) Inventors: Chandra Sekar, Albertson, NY (US); Santosh Sekar, New York, NY (US)

( * ) Notice: Subject to any disclaimer, the term of this patent is extended or adjusted under 35 U.S.C. 154(b) by 0 days.

(21) Appl. No.: 16/539,832

(22) Filed: Aug. 13, 2019

(65) Prior Publication Data
US 2019/0366618 A1    Dec. 5, 2019

Related U.S. Application Data

(63) Continuation-in-part of application No. 16/261,227, filed on Jan. 29, 2019, now Pat. No. 10,421,229, and (Continued)

(51) Int. Cl.
*B29C 53/60*     (2006.01)
*B29C 48/09*     (2019.01)
(Continued)

(52) U.S. Cl.
CPC .......... *B29C 53/607* (2013.01); *B29C 48/09* (2019.02); *B29C 53/60* (2013.01); *B29C 53/827* (2013.01);
(Continued)

(58) Field of Classification Search
CPC . B29L 2031/328; B05C 17/0207; B32B 1/08; B32B 2597/00; B29C 53/60; B29C 53/607; B29C 53/62
See application file for complete search history.

(56) References Cited

U.S. PATENT DOCUMENTS

| | | | | |
|---|---|---|---|---|
| 2,920,372 A | * | 1/1960 | Sannipoli | ............ B05C 17/0207 26/2 R |
| 5,572,790 A | * | 11/1996 | Sekar | .................. B05C 17/0207 29/527.2 |

(Continued)

*Primary Examiner* — Carson Gross
(74) *Attorney, Agent, or Firm* — Beusse, Wolter, Sanks & Maire PLLC; Robert L. Wolter

(57) ABSTRACT

A system and method are provided for conditioning paint roller cover fabric inline in a continuous paint roller manufacturing process. The system and method provide an inline fabric conditioning unit upstream of the point in the process that the paint roller fabric cover strip is wrapped about the outer side of the outer strip, the fabric conditioning unit including a fabric conditioning device that conditions the paint roller fabric cover strip as it is being fed towards the outer side of the outer strip. The fabric conditioning unit may be used to perforate the fabric, to remove loose fibers from the fabric side of the paint roller fabric cover, to buff the paint roller fabric, and to orient the paint roller cover fibers. The continuous paint roller manufacturing process includes steps of feeding an inner strip and an outer strip towards a mandrel, wrapping the inner strip and the outer strip about the mandrel in offset relation, applying a strip adhesive to at least a portion of an outer side of the inner strip and at least a portion of an outer side of the outer strip, feeding a paint roller fabric cover strip having a fabric side and a backing side towards the outer side of the outer strip, the fabric side comprising loose fibers and attached fibers, forming a paint roller tube by wrapping the paint roller fabric cover strip about the outer strip at a point in the process after the strip adhesive has been applied to the outer side of the outer strip such that the backing side contacts the strip adhesive, applying compression to the paint roller tube, and cutting the paint roller tubes into like lengths.

20 Claims, 5 Drawing Sheets

Related U.S. Application Data a continuation-in-part of application No. 16/103,550, filed on Aug. 14, 2018, which is a continuation-in-part of application No. 15/968,476, filed on May 1, 2018, which is a continuation of application No. 15/676,507, filed on Aug. 14, 2017, now Pat. No. 9,956,719.

(51) Int. Cl.
| | | |
|---|---|---|
| *D06B 1/14* | (2006.01) | |
| *B29C 53/82* | (2006.01) | |
| *B29C 65/00* | (2006.01) | |
| *B05C 17/02* | (2006.01) | |
| *B32B 1/08* | (2006.01) | |
| *B29L 31/32* | (2006.01) | |
| *B29C 53/62* | (2006.01) | |

(52) U.S. Cl.
CPC ............ *D06B 1/14* (2013.01); *B05C 17/0207* (2013.01); *B29C 53/62* (2013.01); *B29C 66/02242* (2013.01); *B29C 66/30325* (2013.01); *B29C 2793/0045* (2013.01); *B29L 2031/328* (2013.01); *B32B 1/08* (2013.01); *B32B 2597/00* (2013.01)

(56) References Cited

U.S. PATENT DOCUMENTS

2007/0056132 A1\* 3/2007 Yamaguchi .............. A46B 3/18
  15/230
2011/0099799 A1\* 5/2011 Jackson .................. A46D 9/02
  29/724

\* cited by examiner

SYSTEM AND METHOD FOR CONDITIONING PAINT-ROLLER COVER FABRIC

This application is a continuation-in-part of U.S. patent application Ser. No. 16/261,227 filed Jan. 29, 2019; this application is also a continuation-in-part of U.S. patent application Ser. No. 16/103,550 filed Aug. 14, 2018, which is a continuation-in-part of U.S. patent application Ser. No. 15/968,476 filed May 1, 2018, which is a continuation of U.S. patent application Ser. No. 15/676,507 filed Aug. 14, 2017, the entire disclosures of which are incorporated herein by reference.

FIELD

The present invention relates in general to the field of paint roller manufacturing, and in particular to a novel machine and process for using a conditioning fabric in a process for manufacturing paint rollers.

BRIEF DESCRIPTION OF THE DRAWINGS

Objects, features, and advantages of the invention will be apparent from the following description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
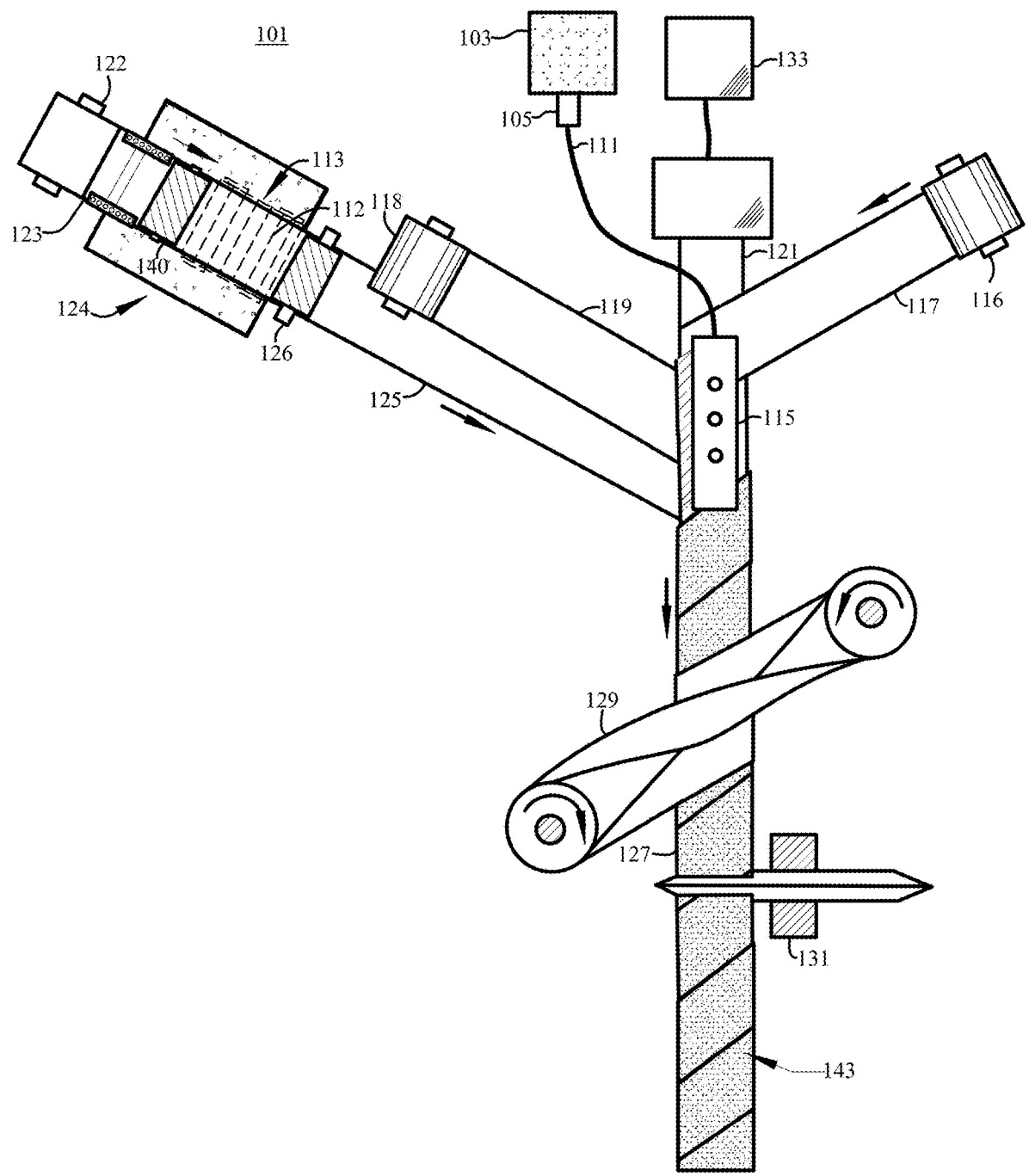
FIG. 1 shows a top view illustrating a machine and process for manufacturing paint rollers in accordance with an embodiment wherein a fabric conditioning process is utilized in a two-strip process paint roller manufacturing process.

Reference will now be made in detail to embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

The quality and condition of the fabric on the outer surface of a paint roller core is important to an end-user's perception of quality, as well as paint application performance. The quality of the paint roller fabric is controlled by both manufacturers of paint roller fabric and manufacturers of paint rollers. Certain factors determine paint roller fabric quality, including fiber density, the quality of the fabric backing, and the materials used to make the fibers are controlled by fabric manufacturers.

A significant issue with lower-quality paint roller fabrics is their tendency to have loose fibers that can become dislodged during the painting process. These fibers can become embedded in the paint, causing undesirable side-effects.

Furthermore, for aesthetic and performance reasons, paint roller manufacturers try to ensure that all paint roller fabric fibers are the same length from the core, and that paint roller fibers are generally perpendicularly oriented with respect to the core (i.e., normal to the core surface). This creates a uniform appearance.

The fabric on the edges of paint rollers are typically beveled at an angle for aesthetic and performance reasons. Beveling each side of a roller core's fabric prevents paint from being applied outside of the length of the roller core.

Disclosed herein are machines and methods for continuous paint roller manufacturing processes which include a step of conditioning paint roller cover fabric inline with the manufacturing process. In an embodiment, the inline fabric conditioning process removes loose fibers and positions the remaining fibers so that they are normal with respect to the fabric backing and/or core of the paint roller. In an embodiment, a comb or carding cloth is run through paint roller fabric as the paint roller fabric advancing towards a roller core as a part of the paint roller manufacturing process, but prior to the time it is applied to the core. In an embodiment, a comb or carding cloth is run through paint roller fabric after it is applied to the core, but prior to the time that a continuously manufactured core is separated into lengths or paint rollers. The machines and methods described herein may be configured to use a fabric cover that has been conditioned inline upstream of the strip winding step in a paint roller manufacturing process, and/or can be configured to condition the fabric inline with the paint roller manufacturing process after the strip winding step (e.g., at the paint roller tube cutting step).

Figure 2:
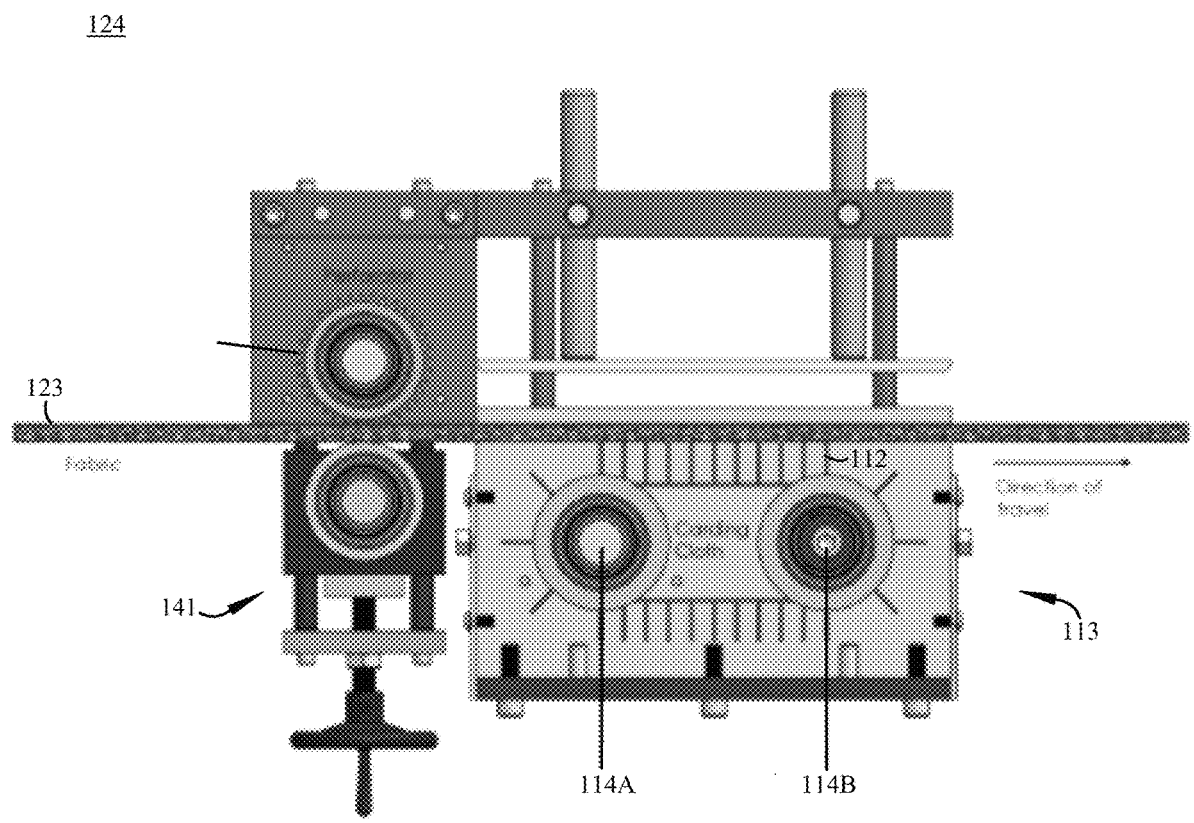
FIG. 2 shows a side view illustrating a fabric conditioning unit utilized in the machine and process shown in FIG. 1.

With reference to FIGS. 1 and 2, a paint roller manufacturing system 101 and process for manufacturing paint rollers in accordance with an embodiment are illustrated. The paint roller manufacturing system 101 includes a cover dispenser 122 that continuously dispenses a windable width of paint roller cover fabric, the paint roller cover fabric having a fabric backing side. A fabric conditioning unit 124 is provided, and may include a perforating wheel 140, a conditioning device 113, and fabric guides to support the fabric and maintain a width-wise dimension of the paint roller cover fabric as the fabric advances across the fabric conditioning unit. In an embodiment, the fabric may be fed from the cover dispenser 122 by motors located outside the machine, or motors within the machine itself. In an embodiment, the fabric from the cover dispenser 122 is drawn towards the downstream process. In an embodiment, the fabric from the cover dispenser 122 is drawn towards the downstream process as a consequence of a winding belt 129. In an embodiment, the fabric from the cover dispenser is drawn towards the downstream processes by a fabric conditioning unit 124.

The paint roller cover fabric 123 may comprise a conventional cover fabric or a coated fabric that has been coated offline or online, as is taught in U.S. Pat. No. 9,956,719 which is incorporated by reference herein in its entirety and shares a common inventor herewith.

In an embodiment, cover fabric 123 fed from the cover dispenser 122 to the fabric conditioning unit 124 is pressed against a perforating roller 140. The perforating roller 140 may have cone-shaped protrusions, or protrusions of other shapes. In an embodiment, the protrusions from the perforating roller 140 end in sharp points. In an embodiment, another wheel, or a plate, or another apparatus 141 pushes the fabric against the perforating wheel. In an embodiment, the force in the direction of the perforating roller 140 made by apparatus 141 may increase the size of the perforation or otherwise increase perforation performance. The apparatus 141 that pushes the fabric against the wheel 140 can be vertically adjusted in order to accommodate fabric of different pile heights. In an embodiment, the perforation roller 140 comprises a plurality of spaced perforators, which may comprise perforating pins, that can perforate the fabric and thus create spaces (e.g., pores) through which adhesive may flow. In an embodiment, the perforators are sharp at a distal end (away from the perforation roller) and are configured so that they can extend through the backing layer of the fabric. Methods and devices for perforating cover fabrics are taught, for example, in U.S. patent application Ser. No. 16/103,550 filed Aug. 14, 2018, which shares a common inventor herewith and is incorporated herein by reference in its entirety. Paint roller fabric can either be perforated in the paint roller manufacturing process, or at any time prior to the fabric being wound around the mandrel, such as when the fabric is manufactured. In an embodiment, perforating paint roller fabric may provide for greater adhesion and/or a reduction in shedding (i.e., the amount of fibers that are dislodged during the paint roller manufacturing process or the process of using a finished paint roller).

In an embodiment, cover fabric 123 fed from the cover dispenser 122 to the fabric conditioning unit 124 is processed by the conditioning device 113. In an embodiment, pre-perforated cover fabric 123 fed from the cover dispenser 122 to the fabric conditioning unit 124 is processed by the conditioning device 113. In an embodiment, the fabric conditioning unit 124 comprises both a perforating roller 140 and a conditioning device, and after being perforated by the perforating roller 140, the fabric is processed by the conditioning device 113. In an embodiment, the conditioning device 113 removes lint and loose fibers, and properly orients the fabric in an upright position normal to the roller core and backing of the fabric. In an embodiment, the conditioning device 113 in the fabric conditioning unit 124 comprises a carding cloth having a plurality of needles 112 that contact the paint roller cover fabric. In an embodiment, a conveyor 114 is provided for conveying the carding cloth past the paint roller cover fabric. It should be noted that the conditioning device 113 is shown in phantom in the top view of FIG. 1 because the conditioning device 113 is positioned on the pile side of the paint roller cover fabric 123. (Note that the orientation of the embodiment shown in FIG. 1 shows the paint roller fabric with the pile side down and the non-pile side up, however, in an embodiment, the paint roller fabric can be fed towards the mandrel at any orientation, e.g., with the non-pile and pile side being, left-right, right-left or down-up, or in between.) FIG. 2 shows a side view of the conditioning device 113 in the fabric conditioning unit 124.

In an embodiment, needles 112 of the conditioning device 113 may be, e.g., straight, oriented at an angle, or straight with an angled tip. In an embodiment, the carding cloth is positioned directly opposite the paint roller fabric, and may travel in the same direction in which the fabric moves, travel in a direction opposite to the direction in which the fabric moves, or remain stationary. In an embodiment, changing the direction of motion of the carding cloth relative to the motion of the fabric can result in varied types of conditioning. In an embodiment, carding cloth travel direction will vary with the fabric used, as different carding cloth travel directions may produce more desirable results than others on a specific fabric pile. In an embodiment, the carding cloth remains in contact with the fabric over a certain distance, for example between 5 to 12 inches, in order to provide a more thorough fabric conditioning than buffing, the latter of which only provides temporary contact against the paint roller fabric.

In an embodiment, a vacuum is used to remove loose fibers directly off of the fabric, and/or to remove debris caused by the fabric conditioning process.

A significant advantage to conditioning of the paint roller fabric, in line, before it is applied to the paint roller core is that this inline manufacturing step eliminates the need to perform the steps involved in fabric conditioning later after the paint roller core/tube has been manufactured, and after the paint rollers have been separated from the continuously produced core. This can save time, money, and labor by eliminating a step from the paint roller finishing process that often takes place after the roller core/tube has been manufactured.

In an embodiment, conditioning device 113 in the fabric conditioning unit 124 comprises a comb.

In an embodiment, a roller 126 is positioned downstream of the fabric conditioning unit 124 and configured to retain the bottom surface (i.e., non-pile side) of the fabric on the top surface of the fabric conditioning unit 124. In an embodiment, roller 126 is part of the fabric conditioning unit 124 and configured to retain the bottom surface (i.e., non-pile side) of the fabric in an operable position and tension for the proper operation of the fabric conditioning unit 124.

A mandrel 121 is provided, and may be cooled by a mandrel cooler 133 so as to facilitate movement of strips around the mandrel in a helical manner without adhesion of the strips to the mandrel and with lower resistance.

First and second strip dispensers 116, 118 are configured to continuously dispense first and second windable widths of strip material 117, 119. A guide system (not shown) may be used to guide the first and second strip coming from the first and second strip dispensers such that it is wound about the mandrel and to guide a paint roller cover fabric to be wound about the first and second strips 117, 119. In an embodiment, the paint roller fabric cover may be coated. In an embodiment, the paint roller fabric cover may be perforated. In an embodiment, the paint roller fabric cover may be coated and perforated. The second strip 119 and/or the first strip 117 may be a solid strip, a perforated strip or an embossed strip (e.g., having recessed dimples or other recessed features).

In an embodiment, an applicator 115 is configured to apply adhesive (which may be glue, a polymer, or a compound polymer with or without a filler material) on substantially all of the outer side of the first and second windable strips 117, 119 upstream of a location where the conventional or coated paint roller cover fabric 125 is wound about the first and second strips. In an embodiment, the adhesive is in a molten state or a liquified state when applied. In an embodiment, the adhesive is molten or liquified polypropylene. In an embodiment, the adhesive is a molten or liquified compound which includes polypropylene. In an embodiment, the adhesive is a molten or liquified compound which includes polypropylene and calcium carbonate.

In an embodiment, a compressing and advancing device 129 is provided for applying inward pressure normal to the mandrel on a conventional or coated paint roller fabric cover 125 after it is wound about the first and second strips 117, 119, and for advancing the first and second windable strips and the paint roller fabric cover along the mandrel 121. As discussed above, the paint roller fabric cover may be conventional, coated, perforated, or coated and perforated.

In an embodiment, the machine includes an extruder 103, which may be configured for extrusion of an adhesive material through a die 105. In an embodiment, the material is molten when it is extruded through the die 105 and the molten material is pushed through hose 111 to the strip-coating adhesive applicator 115. The strip-coating applicator 115 may comprise any device for applying a molten or liquefied adhesive to a fabric, including a die head, sprayer, brush, extruder, or the like.

The inner strip 117 and outer strip 119 of material are helically wound about the mandrel 121 in offset relation. In an embodiment, the offset relation is approximately 50%, that is, the center of one strip wraps at a location under or over (as the case may be) the middle of the other strip. In an embodiment, the offset relation is at least 5% to prevent the seams of the inner strip and the outer strip from aligning. A 5% offset relation refers to having the seam at least 5% of the width of the strip away from the edge of the strip. In an embodiment, the entire inner surface of the inner strip 117 contacts the mandrel 121. In an embodiment, no portion of the outer strip 119 contacts the mandrel 121.

In an embodiment, the inner strip 117 and the outer strip 119 comprise a material that, for a given roller length, will result in repeatable shrinkage due to hardening and setting. In an embodiment, the inner strip 117 and the outer strip 119 comprise a material that, for a given roller length, will result in repeatable shrinkage due to hardening and setting, within a manufacturing tolerance.

In an embodiment, the outer surface of the inner strip 117 and the outer surface of the outer strip 119 are coated with adhesive by the strip-coating applicator 115. In an embodiment (not shown), the strip-coating applicator 115 comprises two separate strip-coating applicators, one to coat each of the two strips 117, 119. Thus, such coating of the outside of each of the two strips may be performed by the same applicator or, in another embodiment, by two separate applicators. As shown in FIG. 1, coating of the strip or strips is performed by a single applicator. In an embodiment, only the outer surface of the inner strip 117 is coated with adhesive by the strip-coating applicator 115. In an embodiment, the strip-coating applicator 115 applies adhesive to either the outer surface of the inner strip or the inner surface of the outer strip such that the adhesive ends out between the inner and outer strips after it is applied. In an embodiment, the strip-coating applicator 115 applies adhesive to either the outer surface of the inner strip or the inner surface of the outer strip such that the adhesive ends up between the inner and outer strips after it is applied, and liquid adhesive applied by an optional fabric coating applicator is not set when the outer strip 119 and the fabric cover 125 come together on the mandrel. In an embodiment, the strip-coating applicator 115 applies adhesive to either the outer surface of the outer strip or the inner surface of the fabric cover 125 such that the adhesive ends up between the outer strip and fabric after it is applied. In an embodiment, a portion of the outer surface (rather than the entire outer surface) of the outer strip 119 (or the only strip in a single-strip embodiment) is coated with adhesive. In an embodiment, the entire outer surface of the outer strip 119 is coated with adhesive.

The strip-coating applicator 115, in each case, may be configured to apply a contiguous or non-contiguous coat of material to the strip. Examples of a non-contiguous coat include, without limitation, a mesh of material, or stripes of coating material. In addition, the strip-coating application may be configured to apply additional material, such as a mesh material in addition to a coating material. In an embodiment, a mesh material and a contiguous coat of material are applied by the strip coating applicator 115. In an embodiment, the mesh material is a resin. In an embodiment, the mesh material is an adhesive mesh. In an embodiment, the mesh material can be wound around the mandrel as the outer strip of material 119 can. In an embodiment, the mesh material replaces the outer strip 119. In an embodiment, only a portion of the outer surface of the inner strip 117 is coated with adhesive. In an embodiment, the entire outer surface of the inner strip 117 is coated with adhesive.

In an embodiment, the strips and/or adhesive are made from or comprise polypropylene. In an embodiment, the strips and/or adhesive comprise a compound of polypropylene and a filler. In an embodiment, the filler comprises calcium carbonate. A variety of formulations for strips and/or adhesive may be found, e.g., in Applicant's U.S. patent application Ser. No. 14/789,723 filed Jul. 1, 2015 and the references cited therein, the entire disclosures of which are incorporated herein by reference. It is not necessary to use strips of identical materials. It is similarly not necessary to employ an adhesive of similar materials to one or both of the strips.

In an embodiment, the material used for both or either of the strips may comprise, for example: (1) commonly-available polypropylene; (2) a blend of polypropylene, with an effective Melt Flow Rate (MFR) of 2-20 g/10 min.; (3) a combination of calcium carbonate ($CaCO_3$) and polypropylene, with $CaCO_3$ ranges used from 10-70% $CaCO_3$; or (4) a combination of calcium carbonate ($CaCO_3$) and a blend of polypropylenes, with $CaCO_3$ ranges used from 10-70% $CaCO_3$.

In an embodiment, the material used for the adhesive may comprise, for example: (1) commonly-available polypropylene; (2) a blend of polypropylenes, with an effective Melt Flow Rate (MFR) of 20-180 g/10 min.; (3) a combination of calcium carbonate ($CaCO_3$) and polypropylene, with $CaCO_3$ ranges used from 10-70% $CaCO_3$; or (4) a combination of calcium carbonate and blend of polypropylenes (one or more of which has a high MFR ranging from 700-1400 g/10 min), with $CaCO_3$ ranges from 10-70% $CaCO_3$ by weight, for an effective total MFR of 20-180 g/10 min. In an embodiment, the adhesive comprises a combination of calcium carbonate and blend of polypropylenes, the combination having an effective MFR within the range of 20-180 g/10 min. In an embodiment, the adhesive comprises a combination of calcium carbonate and blend of polypropylenes, the combination having an effective MFR within the range of 80-170 g/10 min. In an embodiment, the adhesive comprises a combination of calcium carbonate and blend of polypropylenes, the combination having an effective MFR within the range of 160-175 g/10 min.

Once the component parts (e.g., strips, adhesive, cover) are wound about the mandrel 121, the in-process paint roller cover material tube 127 may be driven by a motorized compressing and advancing device. In an embodiment, the in-process paint roller cover material tube 127 is driven by a compressing and advancing device comprising a belt 129 driven by one or more motorized rollers. Operation of the motorized roller may be controlled by a process controller in one-way or two-way communication with the motorized roller(s).

The formed paint roller cover material tube 127 is advanced along the mandrel 121 by the belt 129 to a cutting device 131 that cuts the tube into lengths. The cutting device 131 may be, e.g., a rotary cutter, a flyaway saw, a traveling saw, a stationary cutter, or other suitable cutter, drill, or chopper. In an embodiment, the cutting device is under the control of the process controller.

Spinning has been used previously to remove excess fibers from a formed paint roller tube/core. Spinning is usually done after the paint roller core/tube has been formed, by placing the product on a mandrel and spinning it at high speed. In an embodiment, a paint roller fabric conditioning unit 124 comprises a fabric spinner (not shown) and an accumulator (not shown). In an embodiment, a paint roller fabric conditioning unit 124 comprises a perforation wheel 140 and a fabric spinner. In an embodiment, a paint roller fabric conditioning unit 124 comprises a perforation wheel 140, a fabric spinner and an accumulator. In an embodiment, a paint roller fabric conditioning unit 124 comprises a perforation wheel 140, a first accumulator, a fabric spinner and a second accumulator. In an embodiment, cover fabric 123 is fed from the cover dispenser 122 to the fabric conditioning unit 124, and as part of the fabric conditioning the fabric cover 123 is spun at high speed, e.g., to remove lint. In an embodiment, the fabric 123 is spun at a much faster rate than the manufacturing processing can receive, and thus, a buffering device is used. In an embodiment, fabric is rapidly spun for conditioning and deposited into an accumulator. The spinning process then temporarily pauses until the manufacturing line catches up with the accumulated conditioned fabric. In an embodiment, the fabric is spun at a much faster rate than the manufacturing process can receive, and then spun in reverse, and then forward again, allowing the forward spinning to outpace the reverse spinning by the overall speed of the manufacturing line. The forward-reverse-forward process may employ two accumulators (one on each side of the spinning process) to buffer the input and output, then deposited into an accumulator. In an embodiment, the paint roller fabric cover 123 may be spun forwards and backwards at high speed, and thus may require an accumulator on each side of the spinning system. In an embodiment, paint roller cover fabric 123 is spun around a mandrel such that the paint roller cover fabric is spun at a speed exceeding 1800 RPM so as to remove excess fibers from the paint roller cover fabric. After conditioning, the conditioned fabric is then passed to the remainder of the paint roller manufacturing process from the accumulator.

Figure 3:
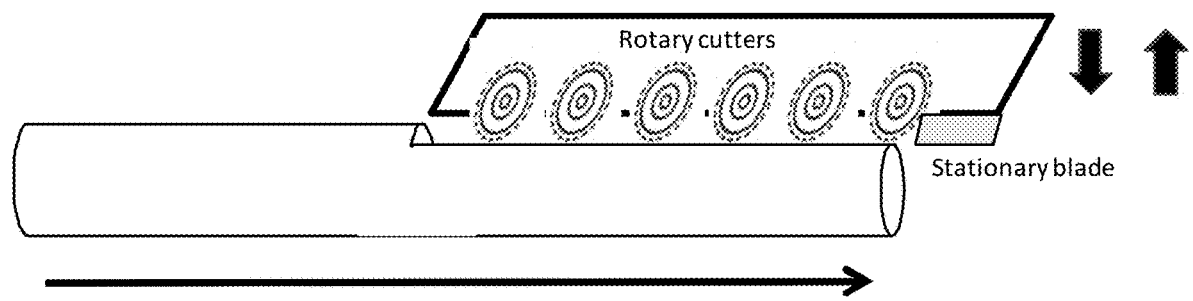
FIG. 3 shows a diagrammatic view illustrating a machine and process for performing inline shearing in accordance with an embodiment of the invention.

FIG. 3 shows a diagrammatic view illustrating a machine and process for performing inline shearing in accordance with an embodiment of the invention. Shearing (also known as "face shearing") ensures that all fibers on a section of fabric are the same height, for aesthetic and performance reasons. This can be done either before or after paint roller fabric is applied to a core/tube. Fibers are cut to a uniform height by a cutting apparatus. In an embodiment, rotary blades are used. In an embodiment, the rotary blades are oriented parallel to the direction of travel of the fabric on the paint roller core/tube. In an embodiment, the rotary blades are oriented in any other direction that results in an even reduction in paint roller core/tube fabric height. In an embodiment, any suitable cutting device may be employed to perform inline shearing. The benefits of performing this action as a part of a continuous single manufacturing process are the same as those of carding/combing fabric inline. In an embodiment, shearing is performed after inline fabric conditioning. In an embodiment, shearing is performed after buffing/sweeping. In an embodiment, shearing is performed when the fibers are generally oriented normal to the roller core, and thus at their maximum height with respect to the roller core.

Figure 4:
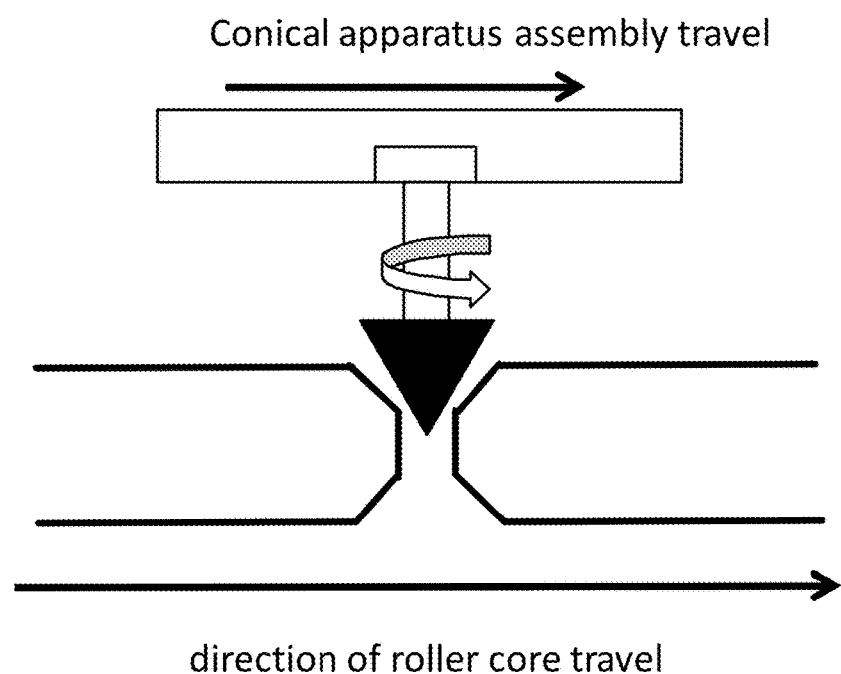
FIG. 4 shows a diagrammatic view illustrating a machine and process for performing inline beveling in accordance with an embodiment of the invention.

FIG. 4 shows a diagrammatic view illustrating a machine and process for performing inline beveling in accordance with an embodiment of the invention. Beveling creates angled edges on each edge of a paint roller. If using a paint roller manufacturing process that cuts rollers to final lengths inline, as opposed to producing tubes that are later cut to final lengths, this can be accomplished inline. In an embodiment, beveling is accomplished by using a set of spinning blades set at angles opposing each other on either side of a cutoff saw. In an embodiment, the blades are applied to the trailing edge of one roller and the leading edge of the next, as the two rollers are separated. In an embodiment, beveling is accomplished by a beveling blade (e.g., a single spinning blade) that is deployed prior to the cutoff saw, but at the same location along the continually manufactured paint roller product. In an embodiment, beveling is accomplished by a beveling blade (e.g., a single spinning blade) that is deployed in lieu of a cutoff saw. A cutoff saw then separates the paint roller at the apex of the beveling blade's cut. In an embodiment, the beveling blade comprises a less angled or straight portion (in cross section) that can cut through the roller core, and an angled portion that can bevel the fabric edge. In an embodiment, the beveling blade or blades move with the continuously manufactured paint roller product as the cut is being made. In an embodiment, both the cutoff saw and the beveling blade or blades move with the continuously manufactured paint roller product as the cuts are being made.

If the paint roller manufacturing process produces larger tubes as opposed to rollers cut to final lengths, beveling is typically performed after paint rollers have been cut, using an apparatus that bevels both sides of the roller simultaneously. The benefits to beveling inline are the same as performing other finishing processes inline. The term "final lengths" refers to lengths of paint rollers that are commonly purchased by end users, or that manufacturers ship to their customers.

Figure 5:
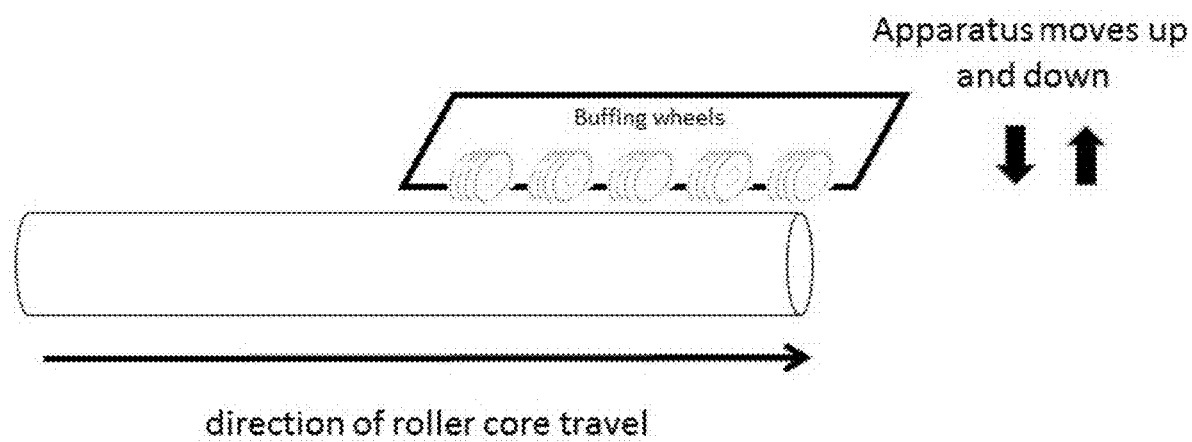
FIG. 5 shows a diagrammatic view illustrating a machine and process for performing inline buffing in accordance with an embodiment of the invention.

FIG. 5 shows a diagrammatic view illustrating a machine and process for performing inline buffing in accordance with an embodiment of the invention. Buffing/sweeping operations use a wheel covered in carding cloth to remove loose fibers and properly orient the fibers that remain on the roller core. This previously was performed after the paint roller/tube has been manufactured. In an embodiment, a wheel, which may be the length of the entire roller/tube or just a portion of it, briefly spins against the roller/tube. In an embodiment, buffing may be performed in a dedicated operation as part of a larger paint roller finishing indexing operation or may be performed in between paint roller finishing operations. When performed in between other paint roller finishing operations, this procedure is called "sweeping".

Figure 6:
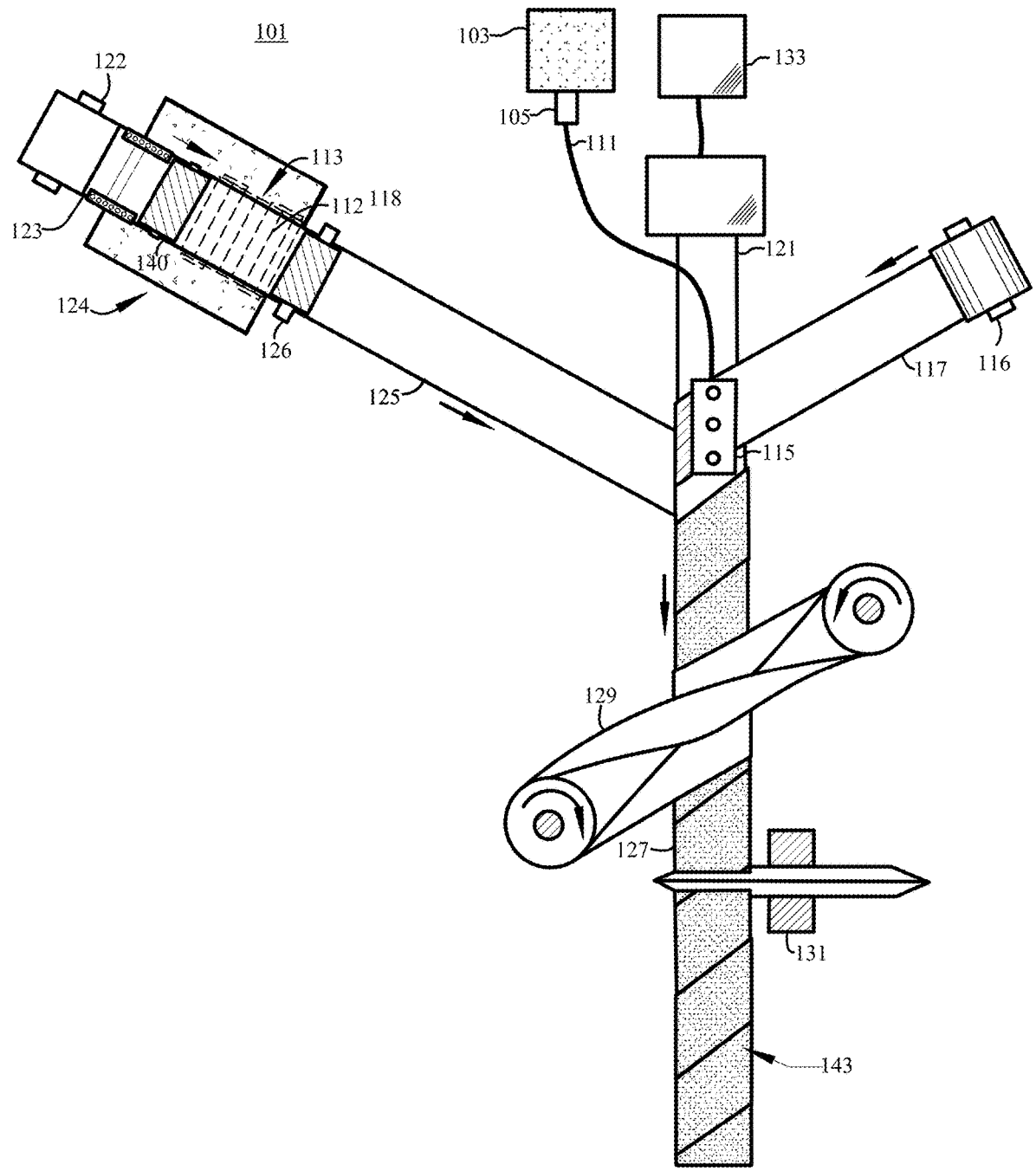
FIG. 6 shows a top view illustrating a machine and process for manufacturing paint rollers in accordance with an embodiment of the invention wherein a fabric conditioning process is utilized in a single-strip paint roller manufacturing process.

FIG. 6 shows single-strip embodiments 601 of the two-strip machine and process shown in FIGS. 1 and 2. These embodiments generally operate as per the descriptions of FIGS. 1 and 2 above, except that a single strip 117 is used instead of the dual strips 117 and 119.

Benefits of using methods inline as opposed to afterwards as part of a finishing process include the following. Firstly, fewer finishing process steps can be used, and this results in an overall process throughput increase. Secondly, the inline methods described herein provide additional opportunities to manipulate fabric in the manufacturing process to further increase fabric quality. Thirdly, the inline methods described herein provide the ability to use less costly paint roller fabrics to make higher-quality rollers, due to the increase in final paint roller fabric quality that inline methods make possible.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, and especially within the claims, ordinal terms such as first and second are not intended, in and of themselves, to imply sequence, time or uniqueness, but rather are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A method for conditioning paint roller cover fabric inline in a continuous paint roller manufacturing process, the continuous paint roller manufacturing process comprising feeding an inner strip and an outer strip towards a mandrel, wrapping the inner strip and the outer strip about the mandrel in offset relation, applying a strip adhesive to at least a portion of an outer side of the inner strip and at least a portion of an outer side of the outer strip, feeding a paint roller fabric cover strip having a fabric side and a backing side towards the outer side of the outer strip, the fabric side comprising loose fibers and attached fibers, forming a paint roller tube by wrapping the paint roller fabric cover strip about the outer strip at a point in the process after the strip adhesive has been applied to the outer side of the outer strip such that the backing side contacts the strip adhesive, applying compression to the paint roller tube, and cutting the paint roller tubes into like lengths, the method comprising:
providing a fabric conditioning unit upstream of the point in the process that the paint roller fabric cover strip is wrapped about the outer side of the outer strip, the fabric conditioning unit including a fabric conditioning device that conditions the paint roller fabric cover strip as it is being fed towards the outer side of the outer strip by removing loose fibers from the fabric side of the paint roller fabric cover and by generally orienting the attached fibers.

2. The method for conditioning paint roller cover fabric inline in a paint roller manufacturing process according to claim 1, wherein the conditioning device comprises a carding cloth having a plurality of needles.

3. The method for conditioning paint roller cover fabric inline in a paint roller manufacturing process according to claim 2, wherein the conditioning device comprises a conveyor for conveying the carding cloth past the paint roller cover fabric.

4. The method for conditioning paint roller cover fabric inline in a paint roller manufacturing process according to claim 3, wherein the conveyor is configured to move in a direction in which the paint roller cover fabric is being fed.

5. The method for conditioning paint roller cover fabric inline in a paint roller manufacturing process according to claim 3, wherein the conveyor is configured to move in a direction that is opposite to a direction in which the paint roller cover fabric is being fed.

6. The method for conditioning paint roller cover fabric inline in a paint roller manufacturing process according to claim 3, further comprising changing a direction in which the conveyor moves prior to feeding the paint roller cover fabric so as to apply an alternate type of conditioning to the paint roller cover fabric.

7. The method for conditioning paint roller cover fabric inline in a paint roller manufacturing process according to claim 2, wherein the conditioning device comprises a stationary carding cloth retaining device for retaining the carding cloth as the paint roller cover fabric moves therepast.

8. The method for conditioning paint roller cover fabric inline in a paint roller manufacturing process according to claim 2, wherein the needles of the carding cloth are oriented normal with respect to a plane of the carding cloth.

9. The method for conditioning paint roller cover fabric inline in a paint roller manufacturing process according to claim 8, wherein the needles of the carding cloth have angled tips.

10. The method for conditioning paint roller cover fabric inline in a paint roller manufacturing process according to claim 2, wherein the needles of the carding cloth are oriented at an angle other than ninety degrees with respect to a plane of the carding cloth.

11. The method for conditioning paint roller cover fabric inline in a paint roller manufacturing process according to claim 2, wherein the carding cloth remains in contact with the paint roller cover fabric for a length of between 5 to 12 inches of travel of the paint roller cover fabric at the conditioning unit.

12. The method for conditioning paint roller cover fabric inline in a paint roller manufacturing process according to claim 2, wherein the conditioning unit uses a wheel covered in the carding cloth to contact the paint roller cover fabric so as to remove loose fibers and to orient fibers that remain on the paint roller cover fabric.

13. The method for conditioning paint roller cover fabric inline in a paint roller manufacturing process according to claim 12, wherein the wheel has a length that is at least equal to a length of the paint roller tube.

14. The method for conditioning paint roller cover fabric inline in a paint roller manufacturing process according to claim 12, wherein the wheel has a length that is equal to a length of a portion of the paint roller tube.

15. The method for conditioning paint roller cover fabric inline in a paint roller manufacturing process according to claim 1, wherein the conditioning device comprises a comb.

16. The method for conditioning paint roller cover fabric inline in a paint roller manufacturing process according to claim 1, further comprising using a vacuum to remove loose fibers or debris caused by fabric conditioning in the fabric conditioning unit.

17. The method for conditioning paint roller cover fabric inline in a paint roller manufacturing process according to claim 1, further comprising winding paint roller cover fabric around a second mandrel such that the paint roller cover fabric is spun at a speed exceeding 1800 RPM so as to remove excess fibers from the paint roller cover fabric.

18. The method for conditioning paint roller cover fabric inline in a paint roller manufacturing process according to claim 1, further comprising shearing the conditioned paint roller cover fabric so as to cause fibers of the paint roller cover fabric to extend from the backing to a more uniform height.

19. The method for conditioning paint roller cover fabric inline in a paint roller manufacturing process according to claim 1, further comprising using a plurality of spinning blades set at angles opposing each other to bevel a trailing edge of the paint roller tube as it is cut.

20. A method for conditioning paint roller cover fabric inline in a single-strip continuous paint roller manufacturing process, the single-strip continuous paint roller manufacturing process comprising feeding a single strip towards a mandrel, wrapping the single strip about the mandrel so that individual adjacent winds are in offset relation, applying a strip adhesive to at least a portion of an outer side of the single strip, feeding a paint roller fabric cover strip having a fabric side and a backing side towards the outer side of the single strip, the fabric side comprising loose fibers and attached fibers, forming a paint roller tube by wrapping the paint roller fabric cover strip about the single strip at a point in the process after the strip adhesive has been applied to the outer side of the single strip such that the backing side contacts the strip adhesive, applying compression to the paint roller tube, and cutting the paint roller tubes into like lengths, the method comprising:

providing a fabric conditioning unit upstream of the point in the process that the paint roller fabric cover strip is wrapped about the outer side of the outer strip, the fabric conditioning unit including a fabric conditioning device that conditions the paint roller fabric cover strip as it is being fed towards the outer side of the outer strip by removing loose fibers from the fabric side of the paint roller fabric cover and by generally orienting the attached fibers.

* * * * *